April 19, 1955 S. M. SHOBERT 2,706,497
FLUID CONDUCTING PLASTIC IMPREGNATED TUBING
Filed March 24, 1952

INVENTOR.
SAMUEL M. SHOBERT,
BY: George A. Gust
ATTORNEY.

United States Patent Office 2,706,497
Patented Apr. 19, 1955

2,706,497

FLUID CONDUCTING PLASTIC IMPREGNATED TUBING

Samuel M. Shobert, Mishawaka, Ind.

Application March 24, 1952, Serial No. 278,179

4 Claims. (Cl. 138—78)

The present invention relates to an improved means for fluid conduction and more particularly to a plastic impregnated cardboard tube which may be provided with a lamination of silica glass.

The object of this invention is to secure a pipe for transporting fluids, that will combine several desirable characteristics, including; water insolubility, resistance to acidic and basic solvents, hardness, tensile and impact strength, and resistance to corrosion. In the accomplishment of this invention, the aforementioned properties are combined with the advantage of being unusually economical in its manufacture and use.

This invention is embodied in plasticized cardboard piping which has a wide range of uses and finds appreciable utility for fluid conduction in household plumbing systems as a substitute for clay tile and the like conduit.

This invention may be further embodied in another form constituted by plasticized cardboard tubing having a silica glass lamination, the inherent physical properties of this latter embodiment making it desirable for use in installations where it will encounter relatively high internal or external pressures. Further, the outer silica lamination provides resistance to bacterial action and general soil corrosion, making the piping adaptable to subterranean use in place of clay tile or the like.

Figure 1:
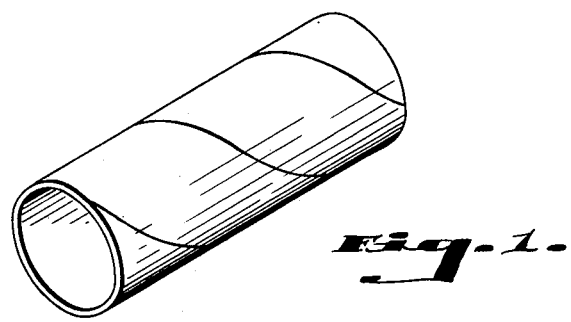
Figure 1 is a perspective illustration of an embodiment of the present invention.

In general, this invention comprises essentially two component materials. A cardboard tube of the desired size and configuration provides the basic unit, and may consist of any well known commercial grade of material as will be explained hereinafter. The raw tube found to be entirely suited for the practice of this invention has relatively little strength and may be easily crushed by the grip of a hand, and further has no resistance to water impregnation which will cause it to lose its strength characteristics altogether. Preferably, a relatively porous cardboard is used, the structure making up the pores serving as a matrix for a purpose to be explained hereinafter.

The second component material is a plastic of the polyester type which is applied to the tube in a manner to fill the pores completely. The particular plastics used are hard and brittle and possess little strength. Yet, when they are polymerized in the cardboard matrix, the resultant product acquires the unexpected attributes mentioned hereinabove which have not been achieved heretofore by the use of similar materials.

By the combination of these particular materials, the long felt want of an economical and reliable substitute for conventional clay tile is realized. While there are a number of other advantages inherent in this substitute, it is noteworthy that there are appreciable differences in weight between the compared products, the plasticized tube being light and easy to handle.

While a number of processes are available for combining the cardboard tubing and the plastic, impregnation by immersion has proven satisfactory.

The cardboard tubing which is used for plastic impregnation is of general commercial manufacture. The physical characteristic required is that it have a preferred degree of porosity so that sufficient plastic can be absorbed in the impregnation stage of dipping the tube in an unpolymerized, plastic bath. As is well known in the art, cardboard consists mainly of cellulose, which comprises long chains of cellobiose units joined together in groups of 50 to 100, each bundle being called a micelle (many of which are required to make up a cellulose fiber). It has been found that the diameter of the cardboard tube or pipe may be varied considerably without any appreciable change in the quality of the final product. The pipe must be of sufficient porosity and absorbency (affected somewhat by the wall thickness) so that impregnation may be complete throughout.

The resin found to give a satisfactory range of desirable physical characteristics for the purpose of this invention is in the thermosetting class and may be characterized as a polyester resin. This polymer is of a polymerization type and is sometimes referred to as "heat convertible." It can form cross links and is believed to undergo further cross linking as a function of temperature and curing time, with the result that the macromolecule becomes appreciably more complex. While it is possible that some chemical reaction may occur between a free acid group in the polymer and the cellulose matrix, such possible chemical reaction may not be necessary to achieve the desirable results of my discovery. As is well known in the art, different characteristics can be achieved by physical orientation of the plastic itself, a prime example of this being the polymer of hexamethylenediamine and adipic acid or "nylon." It is probable that a part of the unexpected results of this invention are achieved by the physical orientation of the polymer due to an interstitial network of the polymer throughout the cellulose fiber matrix. When combined with the relatively viscous alkyd resins, thermoplastic resins, such as styrene, methyl methacrylate and vinyl acetate, give satisfactory results, but they are not as versatile as the thermosetting resin, polyallyl phthlate, which, in addition to being relatively inert to action of acids and alkalies, gives superior heat resistance, better shock strength and improved flexural strength.

The alkyd resin content of the blend may be formed by reacting together substantially stoichiometric parts by weight of an aliphatic ethylene glycol and an unsaturated polybasic acid. It is desirable to include a slight excess (5% to 10%) of the glycol. This reaction is conducted in a kettle by initially applying heat until the temperature of the reaction mixture is approximately 80° C. This initial reaction is very exothermic and care must be taken to avoid an excessive temperature rise. Carbon dioxide is preferably introduced into the reaction mixture in order to maintain an inert atmosphere. After the exothermic phase of the reaction is pressed, the temperature is slowly raised to approximately 160° C. During the entire reaction water is evolved and driven off by heat. Completion of the reaction is determined by the acid number. During the latter stages of the reaction, samples are taken and the acid number of titration with .1 normal alcoholic potassium hydroxide, phenolphthalein being used as an indicator. The reaction is preferably continued until an acid number of 10 is reached. Such reaction products having an acid number between 10 and 60 have been found to be satisfactory.

The following glycols have been used in producing the alkyd and have been found to be satisfactory for compounding my improved resin blend; ethylene glycol, diethylene glycol, propylene glycol, trimethylene glycol and butylene glycol. This group has not more than four carbon atoms in its alpihatic chain.

The polybasic acid used in this reaction is of the unsaturated class preferably having not more than eight carbon atoms in its primary carbon chain. Polybasic acids having longer carbon chains tend to cure to soft rubber-like polymers which are not suited for many of the purposes of the improved resin blend. The following unsaturated polybasic acids are suitable; maleic acid, fumaric acid, mesaconic acid, citraconic acid, glutaconic acid (transisomer and cis-isomer) and muconic acid. It is desirable from a manufacturing consideration to use the anhydride form of any of the foregoing acids which have anhydrides. Accordingly, when the acid is referred to herein and in the claims, reference is made to the acid or its anhydride also. Maleic acid and fumaric acid are readily available and are the preferred unsaturated polybasic acids for the foregoing reaction. Of the two, maleic acid is thought to be the best for this purpose because it has an anhydride which facilitates convenient manufacture.

The allyl alcohol ester of polybasic acid may be made by reacting allyl alcohol with either saturated or unsaturated polybasic acid. Any of the foregoing unsaturated polybasic acids, recommended for use in producing the alkyd resin, may be employed in synthesis of the ester. Saturated polybasic acids may also be used in esterfication reaction, such as oxalic acid, succinic acid, glutaric acid, adipic acid, fumaric acid, suberic acid, azelaic and sebacic acid and phthalic acid. As in the case of synthesis of the alkyd resins, it is desirable to employ the anhydrides of the foregoing saturated polybasic acids and likewise reference herein and in the claims is intended to include the anyhdride of those of the above polybasic acids which have anhydrides.

The allyl alcohol ester component of my improved resin blend may be produced by mixing together substantially two moles of allyl alcohol with one mole of polybasic acid. It is preferable to employ an excess of allyl alcohol ranging from 10% to 20%. This mixture is poured into a reaction kettle containing a mutual solvent for the allyl alcohol and polybasic acid, such as carbon tetrachloride or benzene. A catalyst in amount of ½% to 1% based on the total weight of the allyl alcohol and polybasic acid is then added. This catalyst may comprise concentrated sulphuric acid or para toluene sulphonic acid. Para toluene sulphonic acid when used for this purpose is required in a slightly larger amount (2% to 3%) than the foregoing sulphuric. This mixture is heated by steam coils under refluxing conditions. The reaction starts at about 70° C. with evolution of water and carbon tetrachloride. The carbon tetrachloride and water are condensed and separated. The carbon tetrachloride is returned to the kettle and the water is collected. This refluxing operation is continued until the theoretical amount of water has been collected. The resulting reaction product is then washed with dilute sodium hydroxide until all free acid has been neutralized. The washed reaction product is heated under vacuum to remove the carbon tetrachloride and water introduced by the washing action.

The above described alkyl resin and allyl alcohol polybasic acid ester are mixed together at room temperature and ½% to 5% organic peroxide, such as benzoyl peroxide, is added to the mixture. The organic peroxide is employed as a catalyst to promote polymerization of the two unsaturated resins. Other organic peroxides such as lauroyl peroxide and acetone peroxide may be used for this purpose.

The following are example compositions of my improved resin blend which have been found to have outstanding properties for use in resin fabrication and molding:

I

80% to 40% by weight propylene glycol maleate alkyd
20% to 60% by weight diallyl phthalate
3% to 5% by weight benzoyl peroxide

II

80% to 40% by weight diethylene glycol maleate alkyd
20% to 60% by weight diallyl phthalate
3% to 5% by weight benzoyl peroxide

III

80% to 40% by weight ethylene glycol maleate alkyd
20% to 60% by weight diallyl phthalate
3% to 5% by weight benzoyl peroxide

IV

80% to 40% by weight propylene glycol fumarate alkyd
20% to 60% by weight diallyl phthalate
3% to 5% by weight benzoyl peroxide

V

80% to 40% by weight ethylene glycol fumarate alkyd
20% to 60% by weight diallyl phthalate
3% to 5% by weight benzoyl peroxide

VI

80% to 40% by weight diethylene glycol fumarate alkyd
20% to 60% by weight diallyl phthalate
3% to 5% by weight benzoyl peroxide The reaction products of any of the previously cited unsaturated polybasic acids and any of the glycols set forth may be blended in the proportions of Examples I and VI with diallyl phthatate or any of the foregoing esters of allyl alcohol and either unsaturated or saturated polybasic acids. Variations of the proportions of the alkyd resin and allyl ester components produces corresponding variations in the properties of the blend and physical characteristics of the cured product. The viscosity of the blend, for example, can be controlled by the relative proportions of the alkyd resin and allyl alcohol ester content. Increasing the relative proportion of the alkyd resin increases the viscosity of the blend and increasing the allyl alcohol ester content decreases the viscosity. The alkyd resin ins preferably present in excess of 40% of the blend.

Generally, the optimum viscosity will range from 100–1,000 centipoises; (this is also the most advantageous range for handling the plastic bath). Normally, the unsaturated alkyd is blended with 30% by weight of monomeric styrene or monomeric diallyl phthalate, and the equilibrium viscosity of the mixture has a 400 to 600 centipoise viscosity range.

When the liquid phase monomer and mixture is at the desirable, specified viscosity range, the cardboard tubing is immersed in the plastic solution until there is sufficient absorption, at which time the tubing is removed and racked in a heated chamber at an elevation temperature until the polymerization reaction has gone to completion.

In the second and further embodiment of this invention, the foregoing process is followed with the exception of the curing step. On the wet tube is wound a lamination of high silica glass in fiber form. The glass fiber winding process is performed with the glass fiber under tension, so that on heating the product, polymerization of the plastic will cause an intimate physical bonding between the silica lamination and the plastic impregnated tube. The silica lamination forms an intimate cohesive bond with the tube, which contributes to the flexural and strength properties of the final product. No chemical bonding is believed to take place between the silica glass lamination and the resin.

The foregoing described plastic materials are the only ones known which will produce the desired result when combined with cardboard.

Conduit couplings or fittings, adapted for use with my new and improved tubing may be formed by spinning silica fiber on a threaded pilot mandril; or, if it is desired, the fittings, such as tees, elbows, couplings, etc., can be formed by inserting a threaded mandril into the appropriately shaped, impregnated tube before polymerization. An entire piping system can then be constructed of my new and improved fluid conduction tubing.

By following the foregoing process, tubing may be made in any suitable lengths limited only by manufacturing capabilities. Twenty foot lengths without junctures are possible and this obviously bears an important advantage over the formation of the same length of clay conduit made up of a plurality of joined sections.

A fuller understanding of this invention may be had by reference to the drawings. Figure 1 shows a section of plasticized cardboard tubing in which the raw cardboard serves as the matrix and base material for the plastic.

Figure 2:
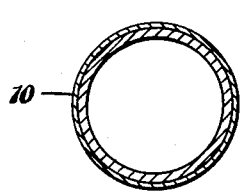
Figure 2 is a cross-section of another embodiment of the present invention.
Figure 3:
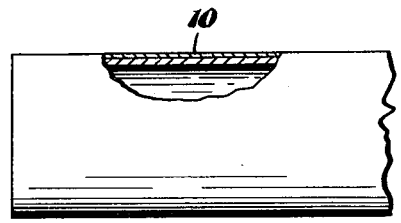
Figure 3 is a partial elevation of Fig. 2 with a portion shown in section.

Figure 2 shows another form of this invention which is similar to the form of Fig. 1 but which is provided with a laminate 10 of tensioned glass thread or fiber currently available on the market and which is being used in the fabrication of fishing rods. In making this product, the raw cardboard tube is impregnated with the unpolymerized plastic and while in this state is close wrapped with glass thread. Any number of layers may be used depending upon the ultimate use to which the product is to be put. The thread is tensioned as it is wrapped since this gives a desired degree of elastic flexure to the product and also contributes materially to the ultimate strength.

Screw threads 12 (see Fig. 4) for joining separate conduit members 14 together may be produced by winding multiple layers of glass fibers for a predetermined length "x" on the ends of the tube. Then a suitable thread mold is clamped over these layers displacing the glass and plastic conglomerate into the thread pattern. The tube is then cured and the mold removed leaving a thread on which a coupling may be fitted.

Figure 5:
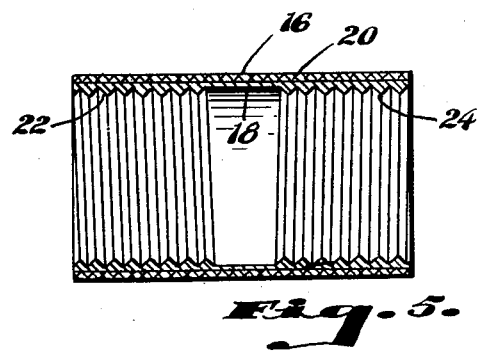
Figure 5 is a coupling adapted to join two conduit sections together.

Unions or couplings 16, Fig. 5, may be made by winding a number of layers of glass threads 18 on a pilot mandril. A wet plastic impregnated cardboard tube 20 is then telescoped over the glass and then the assembly is cured. The mandril is next unscrewed leaving the internal screw threads 22 and 24 in the union. Of course, the pilot mandril must be made in two collinear sections to facilitate removal thereof after the curing since the screw threads 22 and 24 are of opposite pitch.

Figure 4:
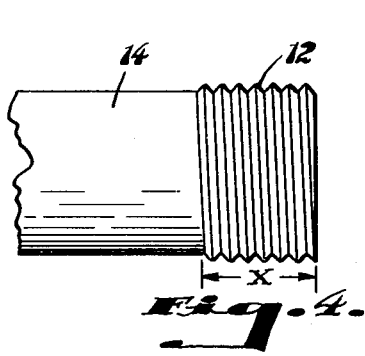
Figure 4 is a fragmental view of a threaded end section of the embodiment of Fig. 2.

The union of Fig. 5 may obviously be used to join two conduit sections, such as the one shown in Fig. 4, together.

It is thus seen that the present invention possesses marked versatility. The materials used being relatively inexpensive, the resultant product is accordingly economical.

Being light in weight and noncorrosive, the product has use in almost any environment and is especially useful in or near salt water and under ground. Other uses are obvious.

It is to be understood that while the invention has been disclosed as embodied in the forms illustrated and described, other objects and embodiments which will occur to the person skilled in the art and which do not violate the scope of the appended claims are intended to be covered.

I claim:
1. A conduit consisting of a tubular porous cardboard matrix having combined therewith and filling the pores of said matrix a cross-linked synthetic thermosetting resin comprised of from about 40 to about 80 parts of an alkyd resin prepared by interaction of approximately stoichiometric amounts of an alkylene glycol having not more than 4 carbon atoms in the carbon chain thereof and an unsaturated polybasic acid having not more than 8 carbon atoms in the primary carbon chain thereof, and from about 20 to about 60 parts of a polymeric ester prepared by the interaction of about 2 mols of allyl alcohol with about 1 mol of an unsaturated polybasic acid having not more than 8 carbon atoms in the primary carbon chain thereof.

2. The conduit according to claim 1, in which the alkyd resin is a polypropyleneglycol maleate and the polymeric ester is a polyallyl phthalate.

3. The conduit according to claim 1, in which the alkyd resin is a polyethyleneglycol maleate and the polymeric ester is a polyallyl phthalate.

4. The conduit according to claim 1, in which the alkyd resin is a polyethyleneglycol fumarate and the polymeric ester is a polyallyl phthalate.

References Cited in the file of this patent

UNITED STATES PATENTS

| | | |
|---|---|---|
| 2,255,313 | Ellis | Sept. 9, 1941 |
| 2,261,985 | Forster | Nov. 11, 1941 |
| 2,417,510 | McGinnis | Mar. 18, 1947 |
| 2,478,181 | Coker et al. | Aug. 9, 1949 |
| 2,491,409 | Kropa et al. | Dec. 13, 1949 |
| 2,528,235 | Loritsch | Oct. 31, 1950 |
| 2,534,617 | Mohrman | Dec. 19, 1950 |
| 2,552,599 | Stout | May 15, 1951 |
| 2,594,693 | Smith | Apr. 29, 1952 |
| 2,609,319 | Boge | Sept. 2, 1952 |
| 2,614,058 | Francis | Oct. 14, 1952 |

FOREIGN PATENTS

| | | |
|---|---|---|
| 837,144 | France | Feb. 2, 1939 |